United States Patent
Chen et al.

(10) Patent No.: US 10,057,762 B2
(45) Date of Patent: Aug. 21, 2018

(54) METHOD AND DEVICE FOR ACQUIRING INFORMATION OF RELAY ROUTER

(71) Applicant: Xiaomi Inc., Beijing (CN)

(72) Inventors: Yong Chen, Beijing (CN); Qiuzhi Huang, Beijing (CN); Yidong Wang, Beijing (CN); Chuan Peng, Beijing (CN)

(73) Assignee: XIAOMI INC., Haidian District, Beijing ( * ) Notice: Subject to any disclaimer, the term of this patent is extended or adjusted under 35 U.S.C. 154(b) by 55 days.

(21) Appl. No.: 15/227,973

(22) Filed: Aug. 4, 2016

(65) Prior Publication Data

US 2017/0105117 A1    Apr. 13, 2017

(30) Foreign Application Priority Data

Oct. 12, 2015    (CN) .......................... 2015 1 0657513

(51) Int. Cl.
| | |
|---|---|
| *H04B 7/14* | (2006.01) |
| *H04W 8/22* | (2009.01) |
| *H04W 76/10* | (2018.01) |
| *H04W 40/22* | (2009.01) |
| *H04W 40/24* | (2009.01) |

(Continued)

(52) U.S. Cl.
CPC ............... *H04W 8/22* (2013.01); *H04W 4/06* (2013.01); *H04W 40/22* (2013.01); *H04W 40/244* (2013.01); *H04W 48/16* (2013.01); *H04W 76/02* (2013.01); *H04W 76/10* (2018.02); *H04W 48/10* (2013.01); *H04W 88/16* (2013.01)

(58) Field of Classification Search
CPC ......... H04W 8/22; H04W 4/06; H04W 40/22; H04W 48/16; H04W 40/244; H04W 76/02; H04W 88/16; H04W 48/10
See application file for complete search history.

(56) References Cited

U.S. PATENT DOCUMENTS

| 2005/0198318 A1 | 9/2005 | Von Mueller et al. |
| 2011/0103264 A1 | 5/2011 | Wentink |

(Continued)

FOREIGN PATENT DOCUMENTS

| AU | 2014263433 A1 | 6/2015 |
| CN | 103401790 A | 11/2013 |

(Continued)

OTHER PUBLICATIONS

International Search Report for PCT/CN2015/099726.

(Continued)

*Primary Examiner* — Afshawn M Towfighi
(74) *Attorney, Agent, or Firm* — Jun He Law Offices P.C.; James J. Zhu

(57) ABSTRACT

A method and device for acquiring information of a relay router are provided. The method includes: sending a first broadcasting message to a relay router in a broadcasting monitoring mode; receiving a second broadcasting message from the relay router when the first broadcasting message satisfies a predefined condition, the second broadcasting message containing address information of the relay router; and when the second broadcasting message satisfies the predefined condition, acquiring the address information of the relay router from the second broadcasting message.

14 Claims, 5 Drawing Sheets

(51) Int. Cl.
   *H04W 48/16* (2009.01)
   *H04W 76/02* (2009.01)
   *H04W 4/06* (2009.01)
   *H04W 48/10* (2009.01)
   *H04W 88/16* (2009.01)

(56) References Cited

U.S. PATENT DOCUMENTS

2015/0039883 A1* 2/2015 Yoon ................. H04L 9/0847
                                                    713/155
2015/0245283 A1    8/2015 Park et al.

FOREIGN PATENT DOCUMENTS

| CN | 103442045 A | 12/2013 |
| CN | 104038989 A | 9/2014 |
| CN | 104113458 A | 10/2014 |
| CN | 1041133458 | * 10/2014 |
| CN | 104159227 A | 11/2014 |
| CN | 104202224 A | 12/2014 |
| CN | 104378801 A | 2/2015 |
| CN | 104640122 A | 5/2015 |
| JP | 2010161468 A | 7/2010 |
| JP | 2012238998 A | 12/2012 |
| KR | 20150004293 A | 1/2015 |
| KR | 1020150069029 A | 10/2015 |
| RU | 2377730 C2 | 12/2009 |

OTHER PUBLICATIONS

Extended European Search Report for EP Application No. 16171403.5 dated Mar. 22, 2017.
International Search Report for PCT Application No. PCT/CN2015/099726 dated Apr. 20, 2017.

* cited by examiner

METHOD AND DEVICE FOR ACQUIRING INFORMATION OF RELAY ROUTER

CROSS-REFERENCE TO RELATED APPLICATIONS

This application is based upon and claims priority to Chinese Patent Application 201510657513.4, filed Oct. 12, 2015, the entire contents of which are incorporated herein by reference.

TECHNICAL FIELD

The present disclosure generally relates to the technical field of wireless communication, and more particularly, to a method and a device for acquiring information of a relay router.

BACKGROUND

Wireless Fidelity (WIFI) is a technology for enabling terminals (such as personal computers, and handheld apparatus such as mobile phones) to be connected with each other in a wireless manner. Due to the restriction of the WIFI technology per se, WIFI signal of one router cannot cover all the area in a relatively large room. In order to improve the WIFI signal coverage, a relay router is used for the extension of WIFI signal.

SUMMARY

According to a first aspect of embodiments of the present disclosure, there is provided a method implemented by a mobile terminal for acquiring information of a relay router, including: sending a first broadcasting message to a relay router in a broadcasting monitoring mode; receiving a second broadcasting message from the relay router when the first broadcasting message satisfies a predefined condition, the second broadcasting message containing address information of the relay router; and when the second broadcasting message satisfies the predefined condition, acquiring the address information of the relay router from the second broadcasting message.

According to a second aspect of embodiments of the present disclosure, there is provided a method implemented by a relay router, including: receiving a first broadcasting message sent by a mobile terminal; and when the first broadcasting message satisfies a predefined condition, sending a second broadcasting message containing address information of the relay router to the mobile terminal, such that the mobile terminal acquires the address information of the relay router from the second broadcasting message when the second broadcasting message satisfies the predefined condition.

According to a third aspect of embodiments of the present disclosure, there is provided a mobile terminal for acquiring information of a relay router, including: a processor; and a memory for storing instructions executable by the processor. The processor is configured to: send a first broadcasting message to a relay router in a broadcasting monitoring mode; receive a second broadcasting message from the relay router when the first broadcasting message satisfies a predefined condition, the second broadcasting message containing address information of the relay router; and when the second broadcasting message satisfies the predefined condition, acquire the address information of the relay router from the second broadcasting message.

According to a fourth aspect of embodiments of the present disclosure, there is provided a relay router, including: a processor; and a memory for storing instructions executable by the processor. The processor is configured to: receive a first broadcasting message sent by a mobile terminal; and when the first broadcasting message satisfies a predefined condition, send a second broadcasting message containing address information of the relay router to the mobile terminal, such that the mobile terminal acquires the address information of the relay router from the second broadcasting message when the second broadcasting message satisfies the predefined condition.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate the embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
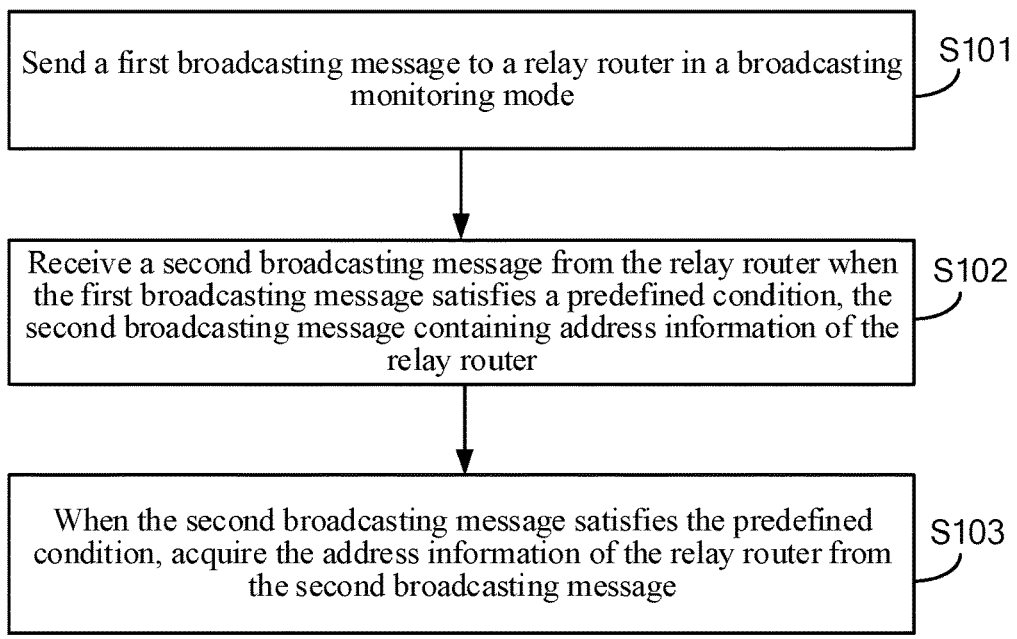
FIG. 1 is a flow chart of a method for acquiring information of a relay router, according to an exemplary embodiment.

FIG. 1 is a flow chart of a method for acquiring information of a relay router, according to an exemplary embodiment. As shown in FIG. 1, the method for acquiring information of the relay router may be applied in a mobile terminal. The mobile terminal with applications (APPs) installed, may include, but is not limited to, a mobile phone, a tablet computer (PAD), and the like. The method includes the following steps S101-S103:

In step S101, a first broadcasting message is sent to a relay router in a broadcasting monitoring mode.

In this embodiment, the relay router may be in a broadcasting monitoring mode via running a program. In this way, the mobile terminal (such as a mobile phone) with APPs installed may send a first broadcasting message to the relay router in the broadcasting monitoring mode.

The first broadcasting message may be a broadcasting message sent based on a user data protocol (UDP).

In step S102, when the first broadcasting message satisfies a predefined condition, a second broadcasting message is received from the relay router. Herein the second broadcasting message contains address information of the relay router.

The situation that the first broadcasting message satisfies the predefined condition may be: the first broadcasting message carries predefined content, such as a customized character string.

After determining that the first broadcasting message carries the predefined content (such as an agreed character string "who?"), the relay router may acquire the address information of the relay router, and send a second broadcasting message containing the address information to the mobile terminal.

The second broadcasting message may be identical to the first broadcasting message, i.e., both of them are broadcasting messages sent based on the UDP.

In step S103, once it is determined that the second broadcasting message satisfies the predefined condition, the address information of the relay router is acquired from the second broadcasting message.

In this embodiment, the second broadcasting message satisfying the predefined condition may be: the second broadcasting message carries predefined content, such as a customized character string.

After receiving the second broadcasting message, if determining that the second broadcasting message carries the predefined content (such as an agreed character string "who?"), the mobile terminal may acquire the address information of the relay router from the second broadcasting message.

In the above embodiments of the method for acquiring information of the relay router, the address information of the relay router is acquired based on the first and second broadcasting messages, thereby the implementing method is simple and quick.

Figure 2:
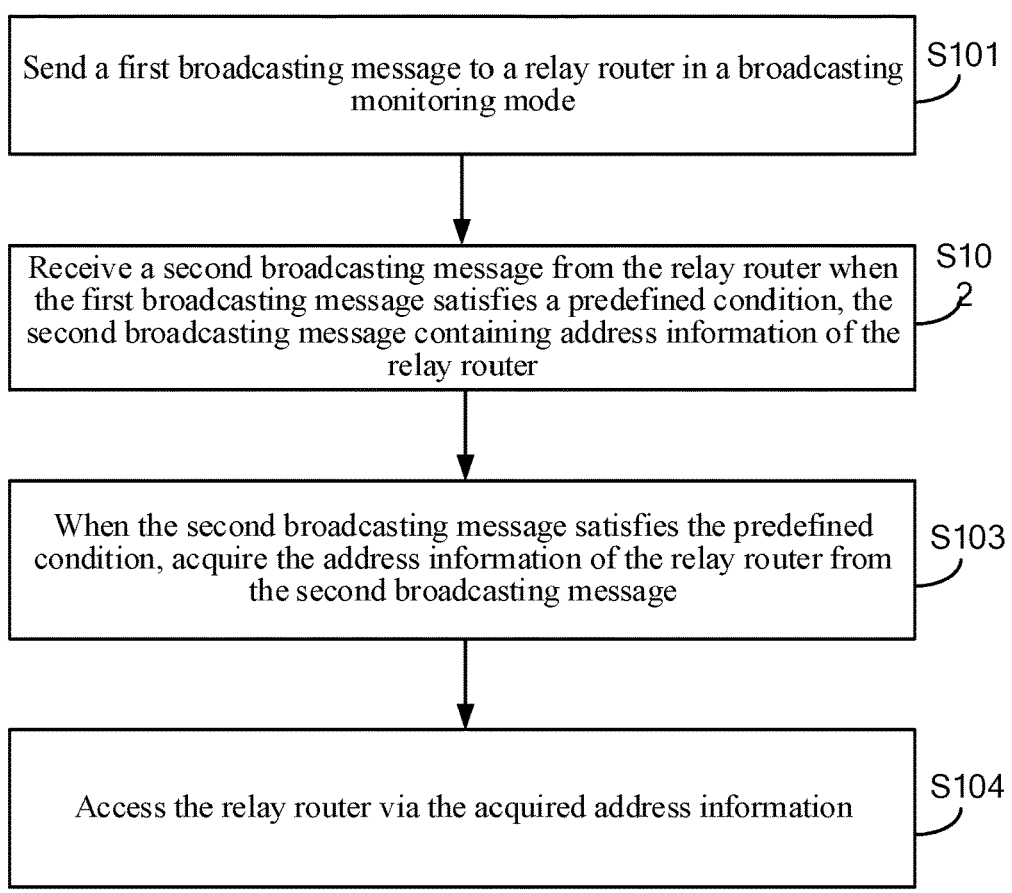
FIG. 2 is a flow chart of another method for acquiring information of a relay router, according to an exemplary embodiment.

FIG. 2 is a flow chart of another method for acquiring information of a relay router, according to an exemplary embodiment. As shown in FIG. 2, after the above step S103, the method may further include the following steps.

In step S104, the relay router is accessed via the acquired address information.

In this embodiment, after acquiring the address information of the relay router, the mobile terminal with APPs installed may access the relay router via the address information, i.e., an IP address.

Through the above embodiments of the method for acquiring information of a relay router, the address information of the relay router may be acquired in a simple and fast way, thereby it becomes easier to access the relay router, i.e., the user may access the relay router without remembering the IP address or inputting the IP address.

Figure 3:
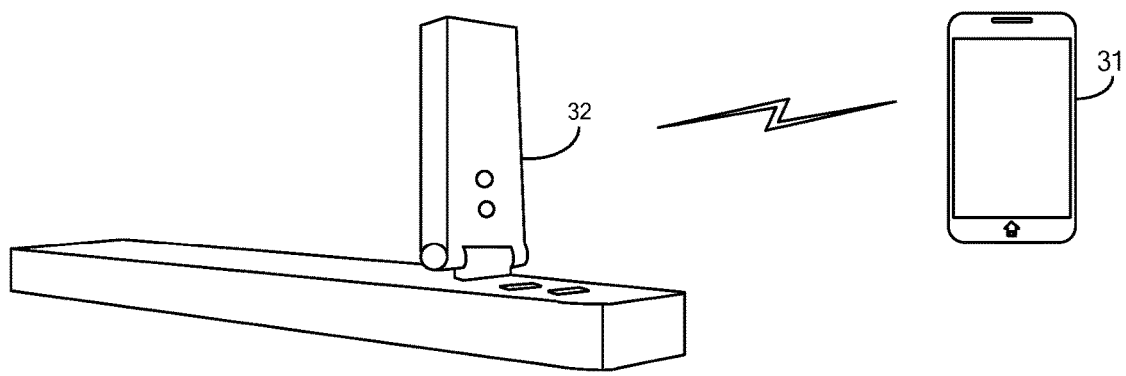
FIG. 3 is a scene graph of a method for acquiring information of a relay router, according to an exemplary embodiment.

Hereinafter, illustrations to the present disclosure are given in combination with FIG. 3. As shown in FIG. 3, the user uses a mobile phone 31 to send a UDP broadcasting message to a relay router 32, then after receiving the UDP broadcasting message, if determining that the UDP broadcasting message contains an agreed content (such as "what"), the relay router 32 sends an IP address of the relay router 32 to the mobile phone 31 in a form of UDP broadcasting message. After acquiring the IP address of the relay router 32, the mobile phone 31 accesses the relay router 32 via the IP address. From above, with this embodiment, the address information of the relay router may be obtained in a simple and fast way based on the UDP broadcasting message, thereby the access to the relay router becomes easier, i.e., the user may access the relay router without remembering the IP address or inputting the IP address.

Figure 4:
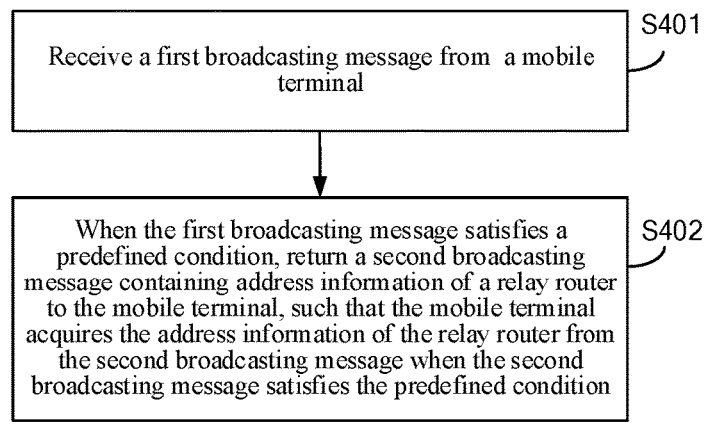
FIG. 4 is a flow chart of another method for acquiring information of a relay router, according to an exemplary embodiment.

FIG. 4 is a flow chart of further another method for acquiring information of a relay router, according to an exemplary embodiment. The method may be applied in a relay router, and the method includes the following steps S401-402.

In step S401, a first broadcasting message sent by a mobile terminal is received.

In this embodiment, the procedure of sending the first broadcasting message by the mobile terminal may be referred to the embodiment shown in FIG. 1, which is not repeated herein. Since the relay router is in a broadcasting monitoring mode, when monitoring the first broadcasting message, the first broadcasting message is received.

In step S402, if the first broadcasting message satisfies a predefined condition, a second broadcasting message containing address information of the relay router is sent to the mobile terminal, such that the mobile terminal acquires the address information of the relay router from the second broadcasting message when determining that the second broadcasting message satisfies the predefined condition.

The first broadcasting message satisfying the predefined condition may be: the first broadcasting message carries predefined content; the second broadcasting message satisfying the predefined condition may be: the second broadcasting message carries the predefined content; and the predefined content may be a customized character string, such as "who?".

In this embodiment, after determining that the first broadcasting message carries predefined content (such as an agreed character string "who?"), the relay router may acquire the address information of the relay router, and send a second broadcasting message containing the address information to the mobile terminal. After receiving the second broadcasting message, if determining that the second broadcasting message carries predefined content (such as an agreed character string "who?"), the mobile terminal may acquire the address information of the relay router from the second broadcasting message.

Both the second broadcasting message and the first broadcasting message may be a broadcasting message sent based on the UDP.

In the above embodiments of the method for acquiring information of a relay router, the address information of the relay router is acquired based on the first and second broadcasting messages, thereby the implementing method is simple and quick.

Figure 5:
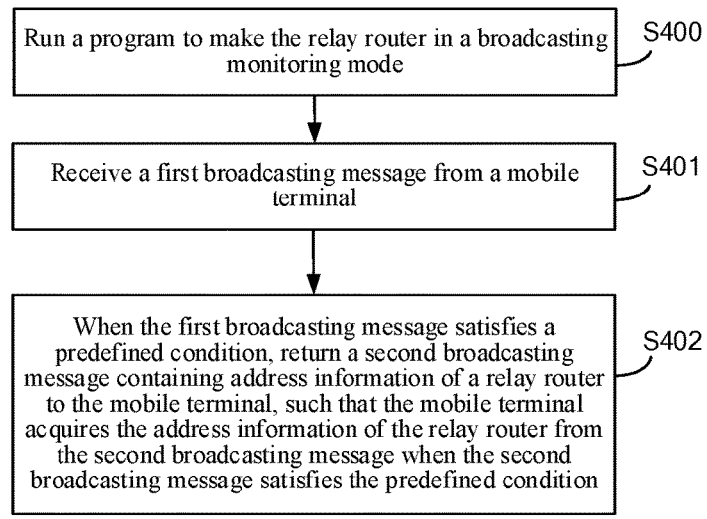
FIG. 5 is a flow chart of another method for acquiring information of a relay router, according to an exemplary embodiment.

FIG. 5 is a flow chart of still another method for acquiring information of a relay router, according to an exemplary embodiment. As shown in FIG. 5, before the above step S401, the method may further include the following step S400.

In step S400, run a program is so that the relay router is in a broadcasting monitoring mode.

In this embodiment, a program may be run in the relay router such that the relay router is in the broadcasting monitoring mode.

In the above embodiments of the method for acquiring information of the relay router, the relay router is in the broadcasting monitoring mode, which provides convenience for the relay router to receive the broadcasting information sent by the mobile terminal.

Figure 6:
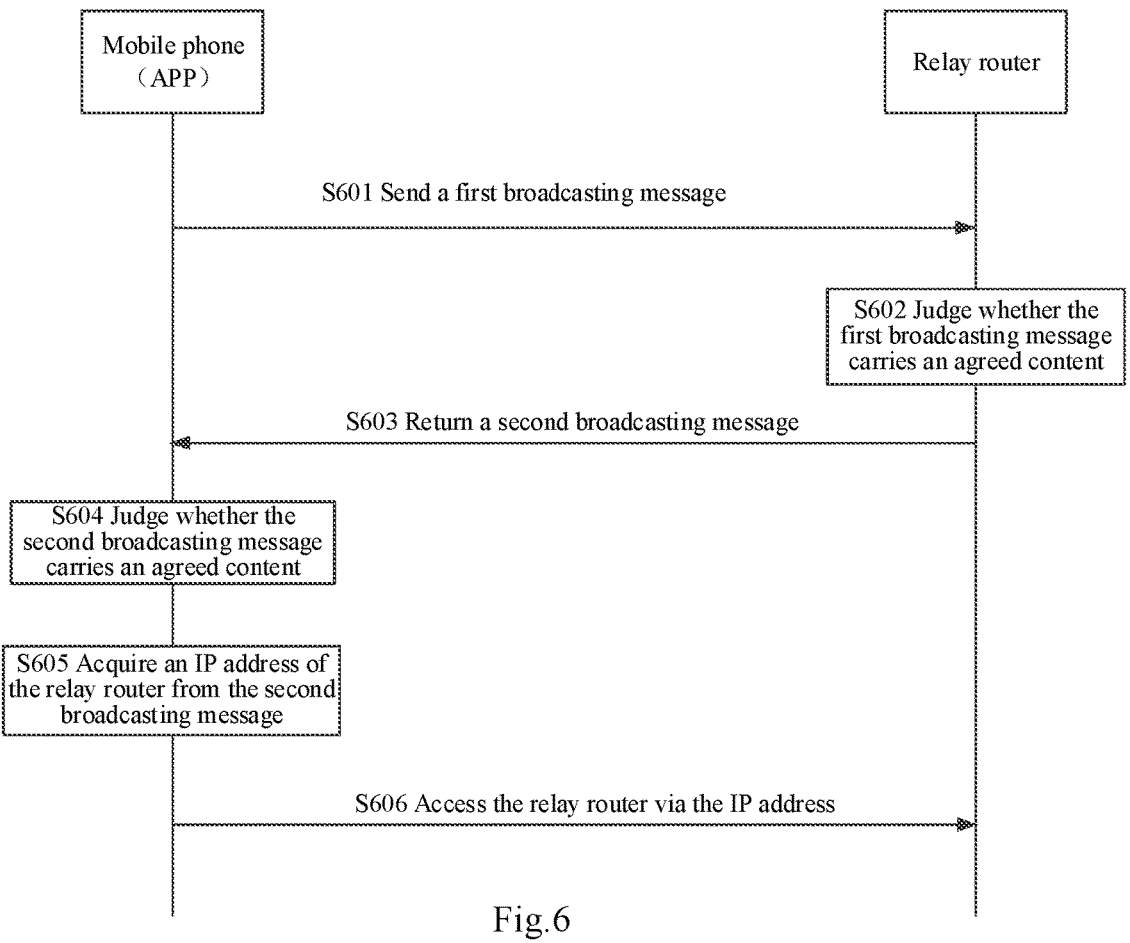
FIG. 6 is a signaling flow chart of a method for acquiring information of a relay router, according to an exemplary embodiment.

FIG. 6 is a signaling flow chart of a method for acquiring information of a relay router, according to an exemplary embodiment. In this embodiment, the depictions are given from the perspective that a mobile phone with APPs installed interacts with a relay router in a broadcasting monitoring mode. As shown in FIG. 6, the method for acquiring information of the relay router includes the following steps.

In step S601, the mobile phone sends a first broadcasting message to a relay router.

In step S602, after receiving the first broadcasting message, the relay router judges whether the first broadcasting message carries an agreed content.

In step S603, if determining that the first broadcasting message carries the agreed content, the relay router sends a second broadcasting message to the mobile phone, wherein the second broadcasting message contains an IP address of the relay router.

In step S604, after receiving the second broadcasting message, the mobile phone judges whether the second broadcasting message carries the agreed content.

In step S605, if determining that the second broadcasting message carries the agreed content, the IP address of the relay router is acquired from the second broadcasting message.

In step S606, the relay router is accessed via the IP address.

In the above embodiments of the method for acquiring information of a relay router, through the interaction between the mobile phone with the APP installed and the relay router in the broadcasting monitoring mode, the mobile terminal may obtain the address information of the relay router in a simple and fast way, thereby the access to the relay router becomes easier, i.e., the user may access the relay router without remembering the IP address or inputting the IP address.

Corresponding to the above-mentioned method embodiments, the present disclosure also provides device embodiments.

Figure 7:
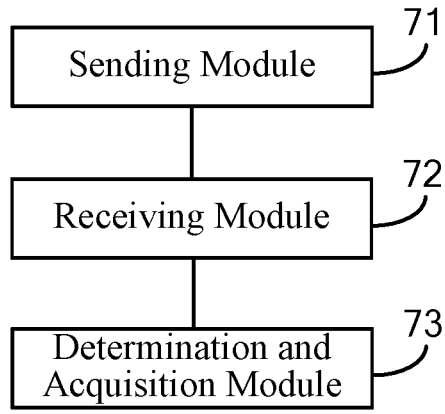
FIG. 7 is a block diagram of a device for acquiring information of a relay router, according to an exemplary embodiment.

FIG. 7 is a block diagram of a device for acquiring information of a relay router, according to an exemplary embodiment. As shown in FIG. 7, the device for acquiring information of the relay router includes: a sending module 71, a receiving module 72, and a determination and acquisition module 73.

The sending module 71 is configured to send a first broadcasting message to a relay router in a broadcasting monitoring mode.

The receiving module 72 is configured to receive a second broadcasting message from the relay router after determining that the first broadcasting message sent by the sending module 71 satisfies a predefined condition, wherein the second broadcasting message contains address information of the relay router.

The determination and acquisition module 73 is configured to acquire the address information of the relay router from the second broadcasting message. After determining that the second broadcasting message received by the receiving module 72 satisfies the predefined condition.

In an embodiment, the relay router may be in the broadcasting monitoring mode by running a program.

In an embodiment, the first broadcasting message satisfying the predefined condition includes: the first broadcasting message carrying predefined content; the second broadcasting message satisfying the predefined condition includes: the second broadcasting message carrying the predefined content; and the predefined content includes a customized character string.

The device shown in FIG. 7 is used for achieving the flow chart as shown in FIG. 1, and the involved description of relevant contents are the same, which is not repeated herein.

In the above embodiments of the method for acquiring information of the relay router, the address information of the relay router is acquired based on the first and second broadcasting messages, thereby the implementing method is simple and quick.

Figure 8:
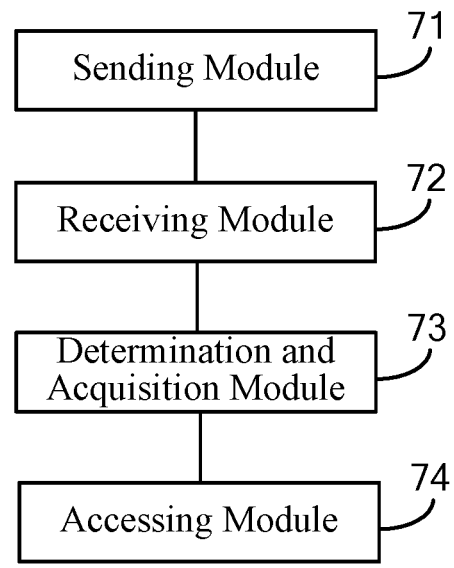
FIG. 8 is a block diagram of another device for acquiring information of a relay router, according to an exemplary embodiment.

FIG. 8 is a block diagram of another device for acquiring information of a relay router, according to an exemplary embodiment. As shown in FIG. 8, on the basis of the above embodiment shown in FIG. 7, the device may further include: an accessing module 74.

The accessing module 74 is configured to access the relay router via the address information, after the determination and acquisition module 73 has acquired the address information of the relay router from the second broadcasting message.

The device shown in FIG. 8 is used for achieving the flow chart as shown in FIG. 2, and the involved description of relevant contents are the same, which is not repeated herein.

In the above embodiments of device for acquiring information of a relay router, the address information of the relay router may be acquired in a simple and fast way, thereby it becomes easier to access the relay router, i.e., the user may access the relay router without remembering the IP address or inputting the IP address.

Figure 9:
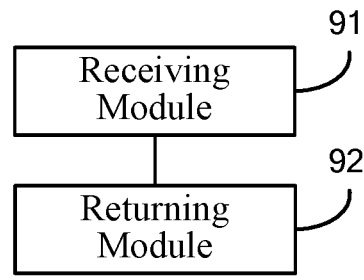
FIG. 9 is a block diagram of another device for acquiring information of a relay router, according to an exemplary embodiment.

FIG. 9 is a block diagram of another device for acquiring information of a relay router, according to an exemplary embodiment. As shown in FIG. 9, the device for acquiring information of the relay router includes: a receiving module 91, and a returning module 92.

The receiving module 91 is configured to receive a first broadcasting message sent by a mobile terminal.

The returning module 92 is configured to send a second broadcasting message containing address information of the relay router to the mobile terminal, after determining that the first broadcasting message received by the receiving module 91 satisfies a predefined condition, such that the mobile terminal acquires the address information of the relay router from the second broadcasting message after determining that the second broadcasting message satisfies the predefined condition.

In an embodiment, the first broadcasting message satisfying the predefined condition includes: the first broadcasting message carrying predefined content. The second broadcasting message satisfying the predefined condition includes: the second broadcasting message carrying the predefined content; and the predefined content includes a customized character string.

The device shown in FIG. 9 is used for achieving the flow chart as shown in FIG. 4, and the involved description of relevant contents is the same, which is not repeated herein.

In the above embodiments of the device for acquiring information of a relay router, the address information of the relay router is acquired based on the first and second broadcasting information, thereby the implementing method is simple and quick.

Figure 10:
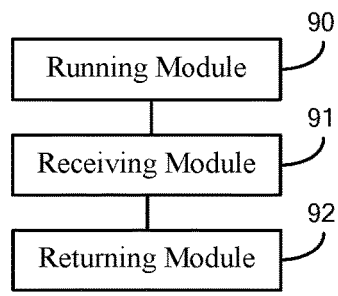
FIG. 10 is a block diagram of further another device for acquiring information of a relay router, according to an exemplary embodiment.

FIG. 10 is a block diagram of further another device for acquiring information of a relay router, according to an exemplary embodiment. As shown in FIG. 10, on the basis of the above embodiment shown in FIG. 9, the device may further include: a running module 90.

The running module 90 is configured to run a program to keep the relay router be in broadcasting monitoring mode, before the receiving module 91 receives the first broadcasting message sent by the mobile terminal.

The device shown in FIG. 10 is used for achieving the flow chart as shown in FIG. 5, and the involved description of relevant contents is the same, which is not repeated herein.

In the above embodiments of the device for acquiring information of a relay router, the relay router is in broadcasting monitoring mode, which provides convenience for the relay router to receive the broadcasting information sent by the mobile terminal.

With respect to the devices in the above embodiments, the specific manners of performing operations by individual modules and submodules therein have been described in detail in the embodiments regarding the methods, which will not be elaborated herein.

Figure 11:
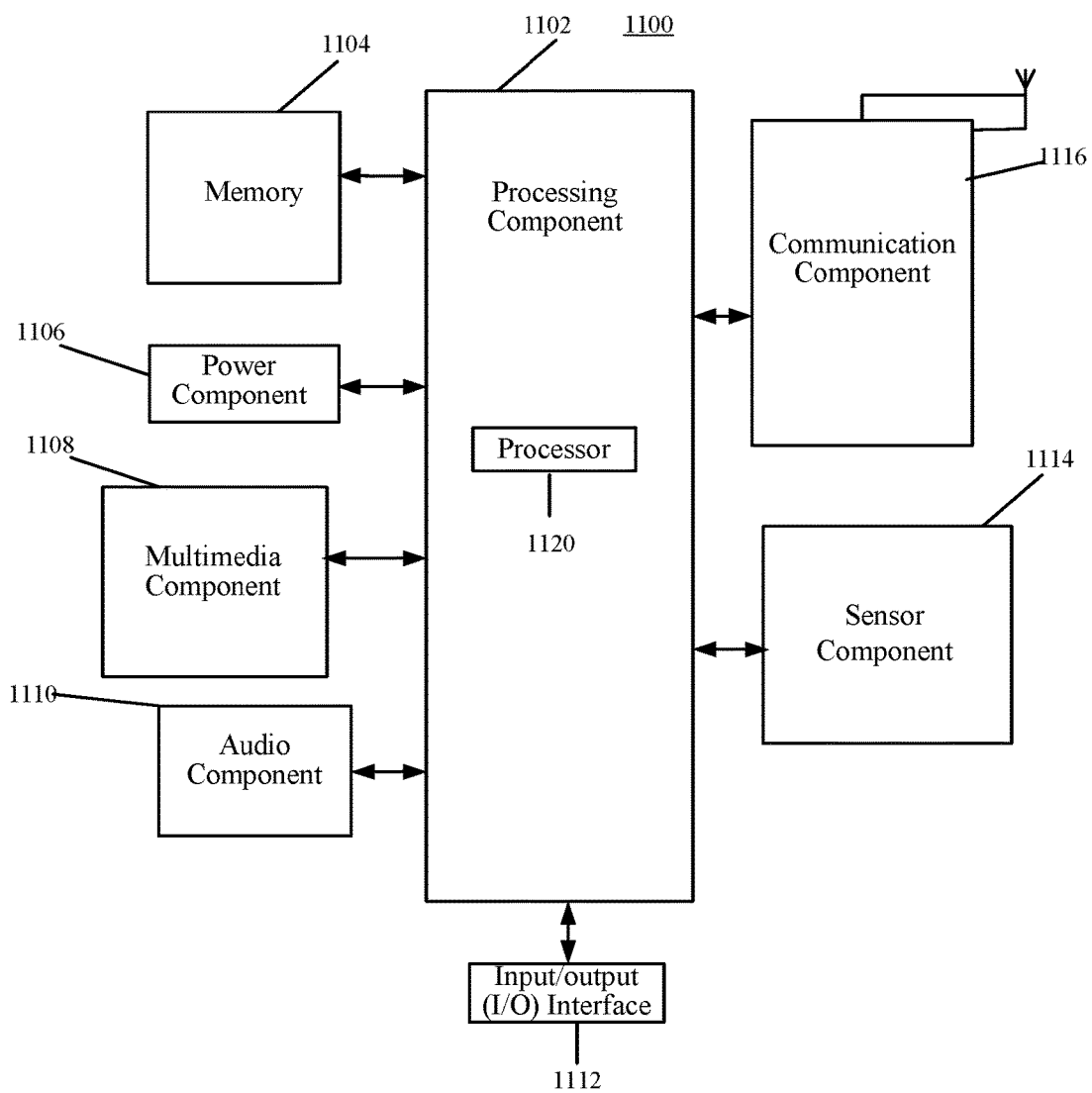
FIG. 11 is a block diagram of a device adapted for acquiring information of a relay router, according to an exemplary embodiment.

FIG. 11 is a block diagram of a device adapted for acquiring information of a relay router, according to an exemplary embodiment. For example, the device 1100 may be a mobile phone, a computer, a digital broadcast terminal, a messaging device, a gaming console, a tablet, a medical device, exercise equipment, a personal digital assistant, an aircraft and the like.

Referring to FIG. 11, the device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the device 1100. Examples of such data include instructions for any applications or methods operated on the device 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the device 1100. The power component 1106 may include a power management system, one or more power sources, and any other components associated with the generation, management, and distribution of power in the device 1100.

The multimedia component 1108 includes a screen providing an output interface between the device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. The front camera and the rear camera may receive an external multimedia datum while the device 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone ("MIC") configured to receive an external audio signal when the device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the device 1100. For instance, the sensor component 1114 may detect an open/closed status of the device 1100, relative positioning of components, e.g., the display and the keypad, of the device 1100, a change in position of the device 1100 or a component of the device 1100, a presence or absence of user contact with the device 1100, an orientation or an acceleration/deceleration of the device 1100, and a change in temperature of the device 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the device 1100 and other devices. The device 1100 can access a wireless network based on a communication standard, such as WiFi, 2G, or 3G, or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1104, executable by the processor 1120 in the device 1100, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method implemented by a mobile terminal for acquiring information of a relay router, comprising:
   sending a first broadcasting message to a relay router in a broadcasting monitoring mode;
   receiving a second broadcasting message from the relay router when the first broadcasting message satisfies a predefined condition, the second broadcasting message containing address information of the relay router; and
   when the second broadcasting message satisfies the predefined condition, acquiring the address information of the relay router from the second broadcasting message;
   wherein the first broadcasting message satisfies the predefined condition is: the first broadcasting message carries predefined content;
   wherein the second broadcasting message satisfies the predefined condition is: the second broadcasting message carries said predefined content.

2. The method of claim 1, further comprising:
   after acquiring the address information of the relay router from the second broadcasting message, accessing the relay router via the address information.

3. The method of claim 1, wherein the relay router is in the broadcasting monitoring mode by running a program.

4. The method of claim 1, wherein
   the predefined content comprises a customized character string.

5. A method implemented by a relay router, comprising:
   receiving a first broadcasting message sent by a mobile terminal; and
   when the first broadcasting message satisfies a predefined condition, sending a second broadcasting message containing address information of the relay router to the mobile terminal, such that the mobile terminal acquires the address information of the relay router from the second broadcasting message when the second broadcasting message satisfies the predefined condition;
   wherein the first broadcasting message satisfies the predefined condition is: the first broadcasting message carries predefined content;
   wherein the second broadcasting message satisfies the predefined condition is: the second broadcasting message carries said predefined content.

6. The method of claim 5, further comprising:
   before receiving the first broadcasting message sent by the mobile terminal, running a program to keep the relay router in a broadcasting monitoring mode.

7. The method of claim 5, wherein
   the predefined content comprises a customized character string.

8. A mobile terminal for acquiring information of a relay router, comprising:
   a processor; and
   a memory for storing instructions executable by the processor;
   wherein the processor is configured to:
   send a first broadcasting message to a relay router in a broadcasting monitoring mode;
   receive a second broadcasting message from the relay router when the first broadcasting message satisfies a predefined condition, the second broadcasting message containing address information of the relay router; and
   when the second broadcasting message satisfies the predefined condition, acquire the address information of the relay router from the second broadcasting message;
   wherein the first broadcasting message satisfies the predefined condition is: the first broadcasting message carries predefined content;
   wherein the second broadcasting message satisfies the predefined condition is: the second broadcasting message carries said predefined content.

9. The mobile terminal of claim 8, wherein the processor is further configured to:
   after acquiring the address information of the relay router from the second broadcasting message, access the relay router via the address information.

10. The mobile terminal of claim 8, wherein the processor is further configured to run a program to keep the relay router in the broadcasting monitoring mode.

11. The mobile terminal of claim 8, wherein
    the predefined content comprises a customized character string.

12. A relay router, comprising:
    a processor; and
    a memory for storing instructions executable by the processor;

wherein the processor is configured to:
receive a first broadcasting message sent by a mobile terminal; and
when the first broadcasting message satisfies a predefined condition, send a second broadcasting message containing address information of the relay router to the mobile terminal, such that the mobile terminal acquires the address information of the relay router from the second broadcasting message when the second broadcasting message satisfies the predefined condition;
wherein the first broadcasting message satisfies the predefined condition is: the first broadcasting message carries predefined content;
wherein the second broadcasting message satisfies the predefined condition is: the second broadcasting message carries said predefined content.

13. The relay router of claim 12, wherein the processor is further configured to:
before receiving the first broadcasting message sent by the mobile terminal, run a program to keep the relay router in a broadcasting monitoring mode.

14. The relay router of claim 12, wherein
the predefined content comprises a customized character string.

* * * * *